United States Patent Office 3,138,538
Patented June 23, 1964

3,138,538
FUEL ELEMENTS FOR NUCLEAR REACTORS
Andrew Thomson Bowden, Newcastle-upon-Tyne, England, assignor to C. A. Parsons & Company Limited, Newcastle-upon-Tyne, England
Filed Nov. 12, 1958, Ser. No. 773,227
Claims priority, application Great Britain Nov. 12, 1957
8 Claims. (Cl. 176—67)

This invention relates to nuclear reactor fuel elements of the kind in which a solid nuclear fuel, for example, natural uranium, is housed in a container.

Under operational conditions in the reactor differential expansion takes place between the container and the fuel and deformation of the container may result. It has been proposed for example, in my co-pending application No. 751,742, now abandoned, to interlock the contacting faces of fuel and container by forming recesses in the fuel than after it has been inserted in the container, applying pressure to the latter so as to cause the material of the container to fill the recesses in the fuel and interlock the faces of fuel and container.

It is possible by such means to reduce considerably movement in an axial direction of the container relative to the fuel but it has been found that when the element is subject to operational temperatures such as exist in the reactor there may be a tendency for the material of the container in the central portion of the elements to spring away from the fuel in a substantially radial direction the effect being that the container tends to take up a barrel shape.

The object of the present invention is to minimise this barrelling effect.

The invention consists in a fuel element for a nuclear reactor which element comprises solid nuclear fuel housed in a container, said fuel having provided therein a plurality of spaced recesses or grooves extending over its length the shape of each groove being such as to lock the metal of the container in the groove against radial movement.

The invention also consists in a fuel element for a nuclear reactor which element comprises a solid bar of nuclear fuel housed in a container, said fuel having provided therein a plurality of spaced recesses distributed over its length the shape of each recess being such as to lock the metal of the container in the recess against radial movement.

The invention also consists in a fuel element in accordance with the preceding paragraph in which each recess forms part of a contaiuous peripheral groove disposed in a plane at right angles to the longitudinal axis of the element.

The invention also consists of a fuel element in accordance with any of the preceding paragraphs save the third preceding paragraph in which the grooves are wedge shaped, the narrower part of the wedge lying in the mouth of the groove.

The invention also consists in a fuel element in accordance with either of the second or third preceding paragraphs in which the walls of the groove have a projection intermediate the mouth and root of the groove.

The invention also consists in a fuel element substantially as described below.

The invention also consists in a fuel element substantially as illustrated in the accompanying diagrammatic drawings in which.

Figure 1:
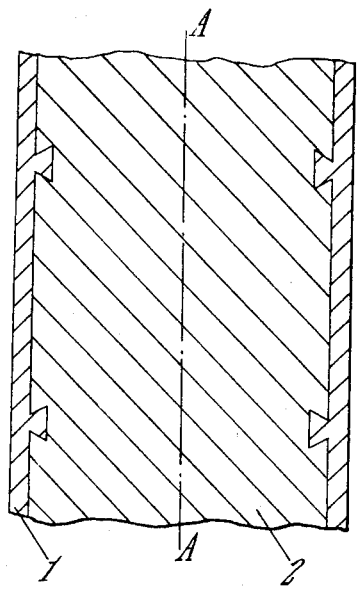
FIGURE 1 shows in section part of a fuel element in accordance with one form of the invention.

In carrying the invention into effect in the forms illustrated by way of example, a fuel element for a nuclear reactor consists of a container 1 housing a solid bar 2 of natural uranium. The uranium contains a plurality of spaced grooves or recesses disposed along its length. The shape of each groove is such that the metal of the container in the groove which is forced into the grooves by the application of pressure to the outside of the container is locked against radial movement. This locking of the metal of the container is achieved in the form shown in FIGURE 1 by making each groove wedge shaped, with the narrower part of the wedge in the mouth of the groove, that is to say the part lying in the outer surface of the uranium.

Figure 2:
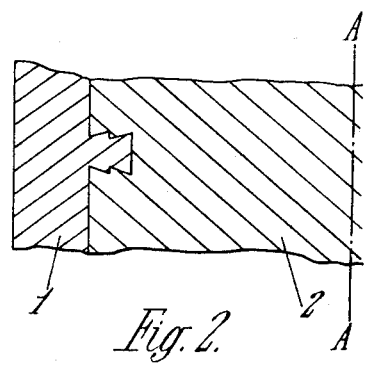
FIGURE 2 shows enlarged section through part of a container wall showing another shape of groove.

Alternatively the sides of the groove may be serrated as shown in FIGURE 2.

Figure 3:
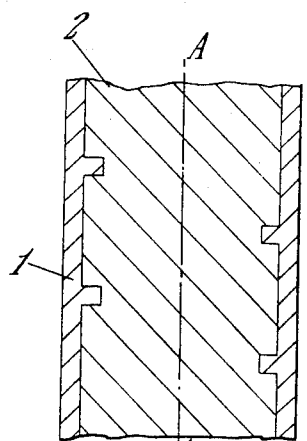
FIGURE 3 shows a section through part of a fuel element showing a groove formation in accordance with another form of the invention.

In another form shown in FIGURE 3 the sides of each groove may be parallel to each other but inclined at an angle to the surface of the uranium which is achieved by cutting a helical groove in the surface of the uranium as shown.

Figure 4:
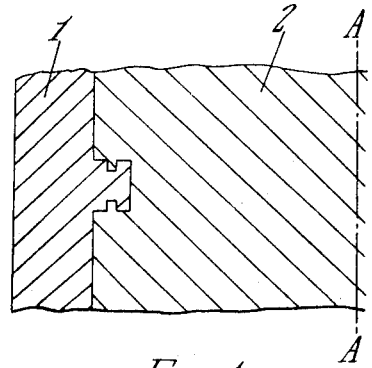
FIGURE 4 shows an enlarged section through part of a container wall showing a further form of groove.

In another form of the invention shown in FIGURE 4 the walls of the grooves have a projection intermediate the mouth and root of the groove. By adopting the above shapes of groove the tendency for the container to spring away from the uranium is eliminated or substantially reduced. Whilst in the above form the recesses described are in the form of continuous grooves around the periphery of the element lying either in a plane at right angles to the longitudinal axis of the element AA or helically disposed with respect thereto, the recesses may take the form of individually spaced recesses in the surface of the uranium bar.

In my application No. 771,860 I describe a fuel element having grooves in the surface of the solid fuel bar the grooves being more closely spaced at the ends of the fuel element than in the middle portion. The purpose of these grooves was to relieve stress concentration caused by relative axial expansion between container and fuel but such grooves do not overcome the barrelling effect described herein. Both the barrelling effect and the effects of differential axial expansion can, however, be overcome when necessary by using the groove disposition described in application No. 771,860 with the shape of groove described in the present application.

I claim:

1. A fuel element for a nuclear reactor which element comprises solid nuclear fuel housed in a container said fuel having provided therein a plurality of spaced recesses or grooves extending over its length, each groove being undercut so as to lock the metal of the container in the groove against radial movement.

2. A fuel element for a nuclear reactor which element comprises a solid bar of nuclear fuel housed in a container, said fuel having provided therein a plurality of spaced recesses distributed over its length, each recess being undercut so as to lock the metal of the container in the recess against radial movement.

3. A fuel element in accordance with claim 2, in which each recess forms part of a continuous peripheral groove disposed in a plane at right angles to the longitudinal axis of the element.

4. A fuel element in accordance with claim 2 in which each recess forms part of a continuous groove helically disposed about the longitudinal axis of the element.

5. A fuel element in accordance with claim 1 in which the groove is wedge shaped, the narrower part of the wedge lying in the mouth of the groove.

6. A fuel element in accordance with claim 3 in which the walls of the groove have a projection intermediate the mouth and root of the groove.

7. A fuel element in accordance with claim 3 in which the groove walls are serrated.

8. A fuel element in accordance with claim 4 in which the groove walls are straight.

References Cited in the file of this patent

UNITED STATES PATENTS

| | | |
|---|---|---|
| 2,838,452 | West et al. | June 10, 1958 |
| 2,873,238 | Ohlinger et al. | Feb. 10, 1959 |